(12) United States Patent
Grong

(10) Patent No.: US 7,131,567 B2
(45) Date of Patent: Nov. 7, 2006

(54) METHOD AND DEVICE FOR JOINING OF METAL COMPONENTS, PARTICULARLY LIGHT METAL COMPONENTS

(75) Inventor: Öystein Grong, Trondheim (NO)

(73) Assignee: Sintef Materialteknologi, Trondheim (NO)

( * ) Notice: Subject to any disclaimer, the term of this patent is extended or adjusted under 35 U.S.C. 154(b) by 17 days.

(21) Appl. No.: 10/495,125

(22) PCT Filed: Nov. 19, 2002

(86) PCT No.: PCT/NO02/00427

§ 371 (c)(1),
(2), (4) Date: May 20, 2004

(87) PCT Pub. No.: WO03/043775

PCT Pub. Date: May 30, 2003

(65) Prior Publication Data

US 2005/0011933 A1    Jan. 20, 2005

(30) Foreign Application Priority Data

Nov. 21, 2001  (NO) .................................. 20015680

(51) Int. Cl.
*B23K 20/12* (2006.01)
(52) U.S. Cl. ..................... 228/164; 228/112.1; 228/115
(58) Field of Classification Search ................ 228/164, 228/112.1, 115
See application file for complete search history.

(56) References Cited

U.S. PATENT DOCUMENTS

| | | | | |
|---|---|---|---|---|
| 2,894,321 A | * | 7/1959 | Dubilier | ...................... 228/115 |
| 4,352,450 A | * | 10/1982 | Edgington | ................... 228/205 |
| 4,934,309 A | * | 6/1990 | Ledermann et al. | ........... 118/50 |
| 5,273,204 A | | 12/1993 | Daial et al. | |
| 5,622,216 A | * | 4/1997 | Brown | ........................ 164/71.1 |
| 6,857,555 B1 | * | 2/2005 | Ishida et al. | .............. 228/112.1 |

FOREIGN PATENT DOCUMENTS

| GB | 1023677 | 3/1966 |
|---|---|---|
| GB | 2149714 | 6/1985 |

* cited by examiner

*Primary Examiner*—Jonathan Johnson
(74) *Attorney, Agent, or Firm*—Dennison, Schultz & MacDonald

(57) ABSTRACT

Method for joining components of metals and alloys, particularly components of light metals, including alloys of light metals and possibly hybrids/composites containing light metals. Oxide on the surfaces to be joined is removed immediately prior to joining, and the groove is filled with a metallic filler material by means of extrusion while the supply of oxygen to the groove is restricted. The invention is also directed to a device for conducting the method, which may optionally include means for heating, means for measurement of temperature and pressure during extrusion as well as controlling means for automation of the joining process.

14 Claims, 2 Drawing Sheets

METHOD AND DEVICE FOR JOINING OF METAL COMPONENTS, PARTICULARLY LIGHT METAL COMPONENTS

This application is a filing under 35 USC 371 of PCT/NO02/00427 filed Nov. 19, 2002.

The present invention concerns a method and a device for joining of metal components and alloys, particularly light metal components, including alloys of light metals and possibly hybrids/composites containing light metals.

BACKGROUND OF THE INVENTION

Traditionally techniques for joining metal components have come as a result of adapting techniques initially developed for joining of ferrous materials.

Joining of metals has largely been connected with fusion welding, where both the base metal and any filler material is melted by an electric arc, electron beam or laser beam, allowing metal to metal bonding to be achieved in the trailing part of the weld pool during crystallisation. In fusion welding only a fraction of the energy supplied contributes to the melting and thereby to bonding. Most of the energy supplied leads to a local heating of the base metal and the formation of a so-called heat-affected zone (in the literature commonly referred to as HAZ) around the weld joint. This zone represents a problem, because the resulting microstructural changes lead to a permanent mechanical degradation of the parent material. The properties of the weld zone will thus become the limiting factor in engineering design and, in practice, determine the load-bearing capacity of the component. In addition, the excess energy (i.e. heat) supplied leads to high residual stresses in the weld region as well as to global deformations and distortions. These problems are greater in aluminum welding than in steel welding, since the possibilities of taking the necessary precautionary actions, e.g. by modifying the HAZ microstructure through adjustment of the base material chemical composition, is more difficult in the former case.

In general, the use of more effective welding processes like laser welding and electron beam welding provides a much narrower HAZ, which in this respect represents a significant improvement. These techniques, however, introduce other problems related to the hot cracking resistance and pore formation in the fusion zone. In addition, they suffer from the disadvantage of more costly and less versatile equipment. Furthermore, the tolerance requirements are much more severe due to the fact that a filler material is usually not added.

In the past several attempts have been made to develop alternative techniques for joining of light metals, of which friction welding or a variant known as friction stir welding (FSW) probably is the most promising one. In FSW the two plates to be joined together are pressed firmly against each other while a rotating tool is moved along the interface (edge) between them, removing the oxide layer that—at least for aluminium—always will be present on the surface. Even though considerable frictional heating occurs at the interface between the rotating tool and the parent aluminium plates, the energy supplied, and thereby the heat generated, is less than in fusion welding, so that the base material near the joint will not melt and reach a liquid state. Friction stir welding is thus an example of a solid state joining technique, which represents a significant improvement compared to fusion welding, as several of the common problems are thereby reduced, namely development of high residual stresses and hot cracks, pore formation and a low corrosion resistance. On the other hand, this novel technique is encumbered with several disadvantages, one being the requirement that the surfaces to be joined need to exactly match each other, as there is no possibility of using a filler material. Another disadvantage is that the components to be joined must be pressed against each other with a considerable force, which means that the method requires heavy and rigid equipment. Finally, even this type of friction welding gives rise to the formation of a wide HAZ, where the resulting microstructural changes lead to permanent softening of the precipitation strengthened material.

Among other methods of joining brazing, riveting and adhesive bonding should be mentioned. One or more of these methods may be convenient for some areas of application, but, in general, they provide a low safety against failure and are therefore not realistic alternatives to welding in load or weight carrying constructions.

SUMMARY OF THE INVENTION

It is an object of the present invention to provide a method for joining of light metals and particularly aluminium, which largely eliminates the disadvantages of the prior art methods.

It is thus an object of the present invention to provide a method for joining of light metal components that is basically developed on the premises of light metals, and not derived from methods intended for ferrous materials.

It is thus an object to provide a method for joining of light metal components where excessive heating is avoided, so that high residual stresses, deformations, hot cracks or extraordinary problems of corrosion will not be a major concern.

Furthermore it is an object to provide a method for joining light metal components where excessive heating is avoided, so that formation of wide heat affected zone, where the material properties are permanently deteriorated, is avoided.

It is still further an object to provide a method for joining light metal components by which it is possible to use a filler material with properties corresponding to the properties of the base material. Finally, it is an object to provide a method for joining of light metals that does not contribute to a large energy surplus, high levels of forces or require narrow tolerance limits. A quest is also to enable the use of simple, compact and possibly portable equipment that can be applied for automation/robotisation.

The method according to the invention provides a novel and highly improved technique for joining light metal components.

The required bonding temperature is achieved by utilising the heat that evolves from deformation and friction, optionally combined with external Joule heating, e.g. in the form of induction heating, electrical resistance heating or heating with a laser beam.

A distinction from the friction stir welding (FSW) process is that it is not only possible but a mandatory feature of the invention that a filler material is added to the joint (groove), allowing joining along surfaces that are not punctiliously shaped to match one another. Neither is it required to apply a high force to the components, nor to squeeze them tight together, which allows the device to be made compact and simple and, if required, suitable for portable use.

Addition of a filler material may seem similar to fusion welding, but the processes are substantially different as the novel method avoids the excessive heating that leads to a significant mechanical degradation, residual stresses and deformations in the material. Neither is it a condition that the filler material added is in a liquid state. It may be liquid, semi-liquid or being in a partially plastic (solid) state when it enters the joint groove. Even in a liquid state it will not give rise to the same degree of heating of the base material that takes place during fusion welding, as the energy is only supplied locally in the groove. This means that negative effects resulting from the heating of the base material become correspondingly small.

Furthermore the material added may be exactly the same as the base material itself. Hence, no material with different or inferior properties is added, which may give rise to corrosion due to galvanic effects or the like, or result in different strength or (thermal) expansion properties compared to the base material. In total the inventive method represents a giant step forward in joining technology for light metal components.

DESCRIPTION OF THE PREFERRED EMBODIMENTS

Figure 1:
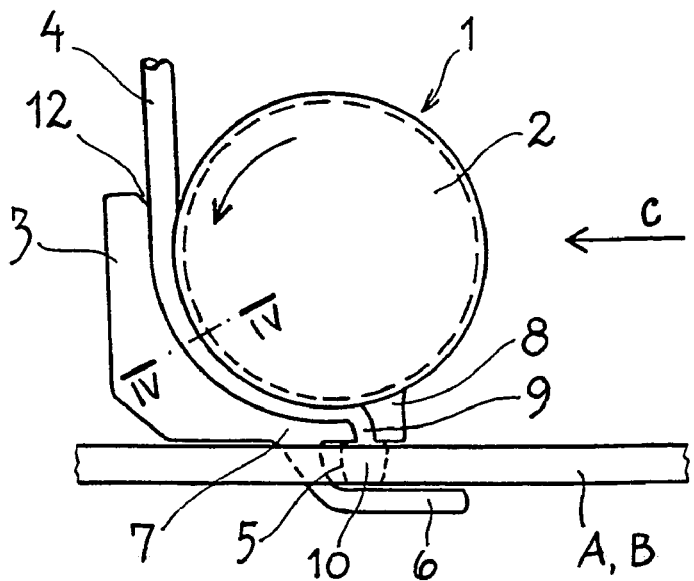
FIG. 1 shows an assembly of a preferred embodiment of a complete device according to the invention.

FIG. 1 shows schematically and simplified a preferred embodiment of a device 1 according to the present invention, comprising an extruder wheel 2, a counterpart 3 to the extruder wheel, a wire 4 of filler material that is added to the device 1 at a point 12 on the extruder wheel 2, an oxide removing tool 5 and a support 6. The material components A and B to be joined are in FIG. 1 arranged behind one another in a common plane, the area to the left of the device 1 being an area where there is still an open groove between the components, while the area to the right of the device 2 is the area where the joining has just been conducted. The direction of the movement of the device is shown by the arrow C. The counterpart 3 is permanently connected to a foot 7 and a stopper 8 that together forms a die 9 from the extruder wheel 2 down into the groove 10. The support 6 limits the groove in a downward direction in cases where there is an open groove, thus allowing the filler material to be forced with a certain pressure down into the groove without being pressed through it.

At a variant of the preferred embodiment (shown in FIG. 1) the lower part of the extruder wheel 2 is arranged level with the surface of the two components of material A and B to be joined, possible even lowered somewhat into the groove. In these cases the counterpart 3 and the stopper 8 also form a kind of a die, as these wholly or partially may extend into the groove 10. If desired, the parts of the extruder wheel 2 that during rotation is in contact with the surface of the two material components A and B to be joined (possibly the surfaces in the groove 10), may have a shape that allows them to function as a cutting or milling tool.

The direction of movement of the device 1 may be as shown by the arrow C in FIG. 1 or the opposite of this. Another possibility is that the entire device 1 is arranged either at a right (90 degrees) angle to the groove or aslant—not parallel as shown in FIG. 1 with the groove 10 (i.e. the extruder wheel may be arranged at an arbitrary spatial angle with respect to the length axis of the groove). The direction of movement of the device 1 will still be parallel to the axis of the groove.

As an alternative to the support 6 the lower part of an open groove may be closed by the provision of a suitable support positioned below the groove in its length direction. Such a support may be a sheet or strip of a ceramic material or steel, to which the solid (plastic) or partially melted filler material does not adhere to with any significant force.

Evidently there is a need for some conventional equipment in addition to the equipment described above, e.g. a power source to turn the extruder wheel, means to hold and move the device at a determined, approximately constant velocity along the groove, etc. In addition, as described below, often it will be convenient to include sensors for registration of temperature and/or pressure at one or more location(s) to better control the process.

Figure 2:
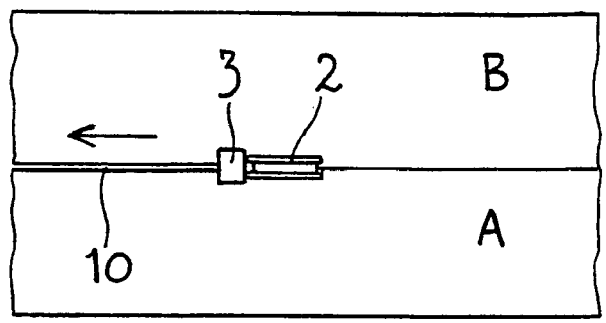
FIG. 2 shows in a simplified manner the device and the material components in FIG. 1 from above.

FIG. 2 shows schematically and in a different scale the material components A and B and the device 1 comprising the wheel 2 in a top view. The groove 10 is open to the left of the device 1 in the direction of movement of the device, while the groove has been closed to the right of the device.

Figure 3A:
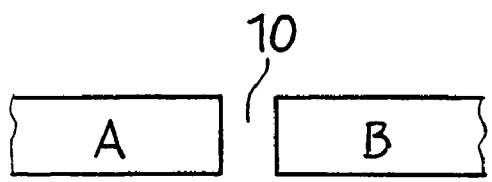
FIG. 3 shows two different types of joint grooves.
Figure 3B:
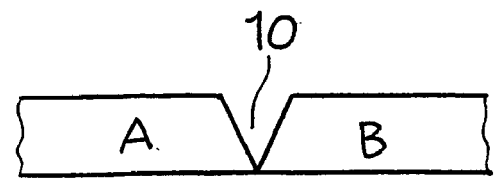

The groove 10 may have an open shape as shown in FIG. 3a or a V-shape, closed at the bottom, as shown in FIG. 3b. The shape of the oxide removing tool 5 will vary according to the groove shape. Correspondingly the need for—and shape of—the support 6 will depend on whether the groove has an open or closed shape.

The oxide removing tool 5 may have different shapes, and in its simplest form it may consist of a scraper with two blades, one for each of the groove surfaces to be cleaned on component A and component B respectively. The tool does not need to rely on mechanical removal only, it may also include the use of certain solvents. Furthermore the tool may possess other mechanical solutions than scraper blades, e.g. a mill.

The groove surfaces do not need to be plane, they may also have a curved shape. For instance, groove surfaces forming a closed groove when the material components are arranged adjacent to each other, may have a U-shape instead of a V-shape. Another option is that the upper part of each groove surface is plane while the lower part is curved. The oxide removing tool must, to a required extent, be adapted to the actual groove configuration, so that sufficient oxide removal is achieved.

Figure 4:
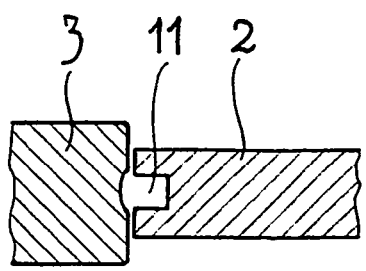
FIG. 4 shows a section along the line IV—IV in FIG. 1.

FIG. 4 shows a section along the line IV—IV in FIG. 1, through the extruder wheel 2 and the counterpart 3. The extruder wheel 2 has a slot along the entire circumference of the wheel, by which the wire 4 is drawn from its point 12 of contact with the wheel 2 down to the die 9. The reduction in cross-section of the filler wire from the contact point 12 to the die 9 may typically be less than a factor 2, which represents a very small cross-sectional reduction during extrusion. The degree of reduction of the filler wire 4 is not decisive for achieving the object of the invention, but it is important that the deformation between the point 12 of contact and the die 9 is sufficient to evenly disperse the surface oxide in the filler material leaving the die 9.

The device according to the present invention shown in FIG. 1 may be modified by applying a filler material 4 in the form of a powder instead of a wire. In this case the powder is fed to the point 12 by means of an appropriate powder feeder (not shown). The general principles of the device are as described above.

Figure 5:
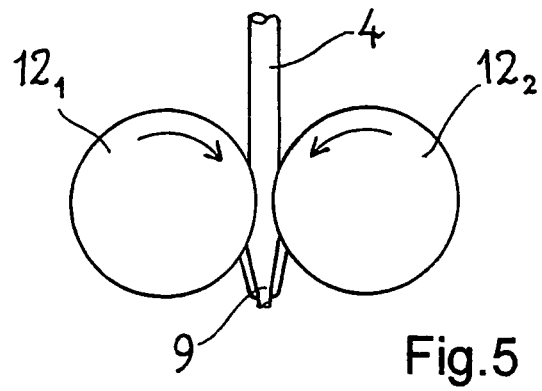
FIG. 5 shows a selected part of another embodiment of the invention than the one shown in FIG. 1.

Furthermore the device may be modified by replacing the extruder wheel 2 and the counterpart 3 with two oppositely rotating extruder wheels $12_1$ and $12_2$, as shown in FIG. 5. In the same manner as for the extruder wheel 2 the two extruder wheels $12_1$ and $12_2$ are provided with slots extending around the entire circumference, which surround the wire-shaped filler material 4. In the same way as for the device shown in FIG. 1, the filler material may be replaced by a powder-like filler material that is fed to the entrance opening between the extruder wheels $12_1$ and $12_2$ by means of a convenient feeder.

The embodiment shown in FIG. 5 involves a technique for feeding of a wire-shaped or power-like filler material to the groove, that can be regarded as extrusion. With extrusion in this document is meant any kind of treatment of a metallic filler material, where the material by means of a process involving direct and/or indirect heating and subsequent pressurising/plastic deformation, is squeezed through a die or the like and added to the groove in a solid (plastic), partially liquid or entirely liquid state, while any oxide layer initially present has been removed or dispersed in the filler material.

The device according to the invention may also be modified by using a screw extruder (not shown) of a per se known type instead of one or two extruder wheels of the illustrated type. In such a case the filler material must be preheated to an extent where it becomes feedable through a screw extruder. The means to be used in contact with the components of base materials, i.e. die, oxide removing tool and possibly support, will be principally the same as in FIG. 1.

The embodiments of the invention described above have the common feature that the filler material is added to the groove by a process based on continuous extrusion. The present invention may, however, also be conducted through a process based on conventional (batchwise) extrusion.

Figure 6:
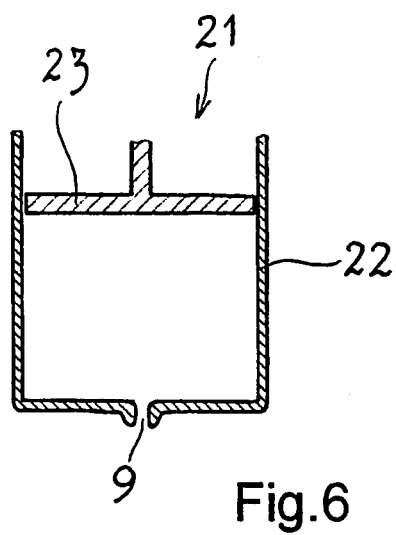
FIG. 6 shows a section of a third embodiment of the device according to the invention.

FIG. 6 shows a device 21 for direct extrusion by means of a cylinder 22, a piston 23 and a die 9 at the end of the piston. The device 21 has in principle the same kind of equipment as shown in FIG. 1 in contact with the base component materials to be joined, i.e. an oxide removing tool 5 and a possible support 6. Batchwise addition of filler material to an extrusion piston may seem inconvenient, but in combination with a fully automated (robotized) handling system, e.g. by employing hermetically sealed packages of the relevant types of filler material being positioned in the cylinder 22 when needed, this may represent a very interesting way of conducting the invention for certain applications.

Other techniques, like indirect extrusion and friction based extrusion, may also be used as an alternative to the method/apparatus illustrated in FIG. 6.

Figure 7:
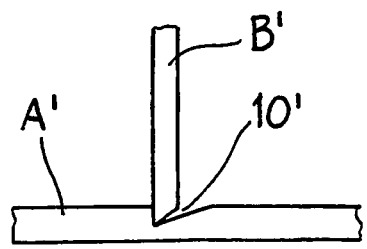
FIG. 7 shows simplified how the method may be used for joining components that are arranged at a right angle with respect to one another.

FIG. 7 shows in a very simplified manner how the method according to the invention may be conducted for joining two sheets in an angel relative to one another, e.g. for making a T-profile. The base material components are prepared by means of milling or the like, so that each of them exhibits a "slanting" edge with equal or different angle. When the material components are positioned adjacent to each other, said slanting edges will constitute the groove surfaces, and the groove 10' may be seen as a variant of the closed groove shown in FIG. 3b. The device to be used for the joining operation involves an oxide removing tool adapted to the angle between the groove surfaces, with a shape compatible with the profile.

Figure 8:
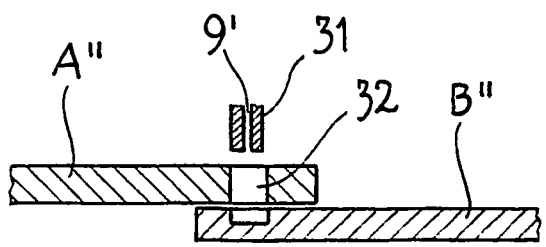
FIG. 8 shows simplified how the method may be used for spot welding of overlapping sheets.

FIG. 8 illustrates how spot welding of two partially overlapping sheets may be performed according to the invention. A tool 31 with the shape of a hollow extruder core or the like is pushed into a pre-machinated hole 32 penetrating wholly the first sheet A" and penetrating partially the second sheet B". As the tool 31 is pulled back, the hole 32 is immediately filled with a plastic or partially liquid filler material through the opening 9' in the tool. In this case the opening 9' functions as a die, and this die 9' and the oxide removing tool are parts of an integrated unit. Another example of spot welding is achieved by an embodiment where the extruder wheel 2 is arranged level with the top surface of sheet A". In this embodiment the counterpart 3 and the stopper 8 together defines a kind of die allowing extrusion of a filler material directly through sheet A" and down into the sheet B" below. In such an embodiment the device evidently does not include a support 6. If desired, the excess material squeezed out from the sheet A" may be removed continuously by letting the extruder wheel to function also as a cutting tool (e.g. a mill). External (Joule) heating of outer parts of the equipment may be used to obtain the desired temperature for extrusion and joining.

Below the process is described in further detail with reference to the embodiment shown in FIG. 1.

The device 1 with the oxide removing tool 5 is brought into position in the groove. If it is an open groove, a support 6 attached to the tool 5, the counterpart 3 and the die 9 by means of a bridging piece, is used. Dependent upon the thickness of the material, the width of the groove etc. the device is adjusted to correct dimensions. With or without preheating the wire 4 is fed to the extruder wheel 2 at the point 12, and pulled with the wheel as this starts to rotate. Since the wire is in contact with the extruder wheel on three sides and in contact with the counterpart on only one side, the wire will at all times follow the wheel. Due to the frictional forces, the wire is gradually heated on its way from the contact point 12 to the die 9. This heating can possibly, and particularly during start-up, be combined with other means of heating, particularly techniques of Joule heating. As the wire is gradually heated it also becomes more and more plastic, and if heated sufficiently it becomes partially liquid. The wire may possibly contain small volume parts of phases (chemical compounds) with lower melting points that at a certain temperature form a lubricating layer on the surface of the wire, which serves to reduce the friction to some extent during extrusion. When the wire reaches the die 9, the stopper 8 extending into the slot 1 at this point objects its continued movement tangentially along the extruder wheel 2. The only open route for the wire/filler material is through the die 9 and into the groove 10. When this takes place, the entire device 1 will normally be moving in the length direction of the groove. In particular cases the device may be at ease.

Alternatively the stopper 8 may be shaped such that only parts of the filler material in the slot 11 is forced through the die 9 while the rest is removed as metal chips through a separate hole made for this purpose in the stopper behind the die 9. The extruder wheel 2 may then rotate at a higher speed without causing blockage of the die 9, thus allowing more frictional heat to be developed while simultaneously improving the possibilities of controlling the temperature and the deposition rate of the filler material into the groove 10.

When moving away from the wheel 2 through the die 9 and down into the groove 10, the filler material is gradually cooled unless particular precautions are taken to avoid it, such as electrical resistance heating of the die. Whether or not such special heating is convenient or necessary is decided in each particular case. For many applications the length of the die 9 may be limited to a few millimetres, thus reducing the need for special heating. To ensure optimal conditions when the filler material leaves the die and enters the groove, it is convenient to have a continuous temperature control at this stage of the process. More preferred is to use an automatic temperature control with a temperature sensor arranged in or near the die. Furthermore it is an option to use local heating of separate parts of the device/process, such as the tool 5, the support 6, the die 9, the groove surfaces and/or the filler material. When the oxide removing tool 5 is a scraper, which represents a preferred embodiment, it is convenient that the blades of this are heated in order to reduce the force required to remove the oxide layer.

It is furthermore preferred that the pressure at the die opening during extrusion can be controlled and held at a constant level, independent of the choice of process conditions, in order to obtain good metallic bonding and the desired microstructure in the as-deposited filler material after bonding. The reason for this is to enable optimisation of properties like yield and tensile strength, toughness, ductility, fatigue strength and corrosion resistance. Means suited for the purpose is a system for measurement and adjustment of the torque or force acting on the extruder wheel, extruder piston or extruder screw, depending upon the equipment used. A precondition for maintaining such a fixed pressure at the die opening is that the filler material is kept in a closed system as long as it is plastic or partially liquid. If the groove is open as shown in FIG. 3*a*, use of a support 6 is required for maintaining such a pressure. Furthermore it requires that the foot 7 and the stopper 8 that together form the die opening 9, have a shape and a size such that they together constitute the required sealing over the otherwise open groove 10, 10'.

Normally the material components to be joined will be of the same type, but they may also be of different types as long as their properties are compatible. The components may e.g. be made from aluminium alloys containing different alloy elements. In such a case the filler material may be identical with one of the alloys or it may have a composition in between the two alloys, that chemically acts as a "bridge" between the two. Components of aluminium alloys within the series 1XXX, 2XXX, 3XXX, 5XXX, 6XXX and 7XXX respectively may be joined together by means of the method and device according to the present invention, with a convenient choice of filler material for the combination of alloys in question.

With respect to the filler material, this may be varied in many ways and for different purposes. It has been mentioned that it may comprise small volume fractions of a phase (chemical compound) that melts at a comparatively low temperature in order to obtain a lubricating effect during extrusion.

The filler material may optionally also comprise different elements that alter the electric (ohm) resistance of the material in a desired direction. If resistance heating is to be applied directly to the wire, the electric resistance should not be too low as high currents would then be required to achieve the desired heating. High current are undesirable as this requires large dimensions of cables and related electric equipment.

In general the filler material to be used must be compatible with the base material and may be adjusted in accordance with this in order to optimise properties like extrudability, yield and tensile strength, toughness, ductility, fatigue strength and corrosion resistance during or following the joining operation. The filler material may thus initially contain different elements or phases that from extrusion practice and industrial heat treatment are known to e.g. suppress recrystallisation and enhance precipitation, thereby recovering additional strength following natural or artificial ageing. Except for such minor deviations the chemical composition should be as close as possible to that of the base material in order to obtain the desired corrosion properties As mentioned it is important that the surfaces to be joined are "virginal" i.e. that they are clean and free from oxide. This is achieved by removing the oxide from the surfaces immediately prior to the deposition of the filler material into the groove and by limiting access of oxygen to this area to a required extent within the short period of time passing until the filler material fills the groove. Inert gas or other type of protecting gas may be supplied to the area between the oxide removing tool and the die to reduce the supply of oxygen to the same area of the groove. The device according to the invention also allows the "room" behind the oxide removing tool to form an enclosure that at all times is filled with filler material. In that case the addition of inert gas/protection gas may be superfluous.

By the method and device according to the invention the previously discussed intended advantages are obtained, i.e. the base material is not subjected to unnecessary or undesired heating leading to material softening and degradation. At the same time minor imperfections in the surfaces to be joined and variations in width of the groove between the material components may be compensated by filler material additions.

EXAMPLES

The subsequent examples were conducted solely to test the invention on a principle level, far from its optimal range. Thus no kind of preheating was used and no kind of oxide removal was performed in connection with these trials.

Example 1

Attempt to Join 2.4 mm Sheets of AA 1070 Using AA 6082 as Filler Material

Experimental Set-Up:

A 40 mm diameter extruder wheel was used, arranged level with the surface of the two sheet components to be joined. The width of the slot in the wheel was 1.5 mm and the depth 2.4 mm, suitable for feeding a 1.6 mm wire. An open I-shaped groove (1 mm root gap), pre-machined in the length direction of the sheet was used, with a thick steel plate acting as backing (support), and the extruder wheel arranged with its slot parallel with the length direction of the groove. No external heat was applied either to the wire, extruder or tools during the joining operation. Neither was mechanical oxide removal or cleaning of the surfaces conducted.

Result:

The joining was conducted in a length of 20 mm by forcing the rotating extruder wheel against the sheet components. The components were moved horizontally relative to the extruder with a constant velocity on a feeding table. Subsequent visual inspection of the two components revealed that the filler material had been squeezed into the groove with considerable force and had become severely cold-deformed. Bonding was obtained at the surface where the plastic deformation had been most severe.

Example 2

Attempt to Spot Weld Two 5 mm Sheets of Fully Annealed AA 6082 Using an I-Shaped Groove and AA 6082 as Filler Material Experimental Set-Up:

A 40 mm diameter extruder wheel was arranged level with the surfaces of the two components to be joined. The width of the slot in the wheel was 1.5 mm and the depth was 2.4 mm, suitable for feeding a 1.6 mm wire. A 3 mm deep I-shaped groove (1.5 mm root gap) pre-machined in the length direction of the sheet components was used, with the slot in the extruder wheel arranged at a 90 degrees angle relative to the groove line. No external heating was applied neither to the wire, extruder or tools during the joining operation. Neither was mechanical oxide removal or cleaning of the surfaces conducted.

Result:

The joining was conducted by forcing the rotating extruder wheel against the sheet components that were at ease. Subsequent visual inspection of the two parts showed that the filler material had been squeezed into the groove with a considerable force, and that the groove surfaces, and particularly the one located adjacent to the stopper, had been subjected to severe plastic deformation. Bonding was obtained at the groove surface where the deformation had been most severe. Hardness measurements performed in a cross-section of the joint showed that the as-deposited filler material was significantly harder than the base material. At the same time characteristic flowlines were observed in a light microscope, both in the base material (along the deformed groove surfaces) and in the as-deposited filler material.

Example 3

Attempt to Join Two 5 mm Sheets of Full Annealed AA 6082 Using a V-Shaped Groove and AA 6082 as Filler Material Experimental Set-Up:

A 40 mm diameter extruder wheel was arranged level with the surface of the two sheet components to be joined. The width of the slot in the wheel was 1.5 mm and the depth was 2.4 mm, suitable for feeding a 1.6 mm wire. A V-shaped (closed) groove with a depth of 4 mm and a maximum width of 4 mm had been pre-machined in the length direction of the sheet components, with the slot in the extruder wheel arranged in parallel with the groove line. No external heating was applied neither to the wire, extruder or tools during the joining operation. Neither was mechanical oxide removal or cleaning of the surfaces conducted.

Result:

The joining was conducted in a length of about 60 mm by forcing the rotating extruder wheel against the sheet components. The sheet components were moved horizontally with a constant velocity relative to the extruder on a feeding table. Subsequent visual inspection showed that the filler material had been squeezed into the groove with a considerable force and had been severely cold-deformed. Both groove surfaces showed signs of local plastic deformation. Bonding was obtained in a length of about 5 mm along one of the groove surfaces.

The examples discussed above show that the method according to the invention works according to the intention, as the filler material is able to be squeezed into the groove and fill it even without employing any kind of preheating of the tool, the base material or the filler material. In order to obtain a joint of acceptable quality, however, the oxide layer in the groove should normally be removed and/or a local heating of the groove, the tool or the filler material should be conducted.

The following properties and advantages are deemed to be typical for the process/device according to the invention:

The total heat supply is similar to that of laser-beam welding and electron-beam welding.

The width of the heat affected zone HAZ is very narrow, and in practice smaller than or equal to the thickness of the base material.

Local residual stresses, global deformations and distortions subsequent to joining is at a level corresponding to laser-beam welding and electron-beam welding and significantly less than for (flame) arc welding.

The tolerance requirements are similar to those of conventional arc welding processes.

There are no problems related to hot cracking or pore formation in the as-deposited filler material, even when this has the same chemistry as the base material.

Corrosion properties are comparable or better than for friction welds of the same alloys, and again significantly better than for fusion welds.

The fatigue strength is comparable to that of friction welds or conventional fusion welds subsequent to the removal or smoothing of the reinforcement by machining.

The method and device according to the invention is easy to automatize/robotize in the same manner as conventional welding processes.

The method according to the invention is principally suited for joining of all types of sheet, tubes and profiles that can be joined by conventional welding processes and methods, and at all positions. It may in principle be applied to spot welding of sheets (also in combination with adhesive bonding) as an alternative to electrical resistance welding, riveting or other form of mechanical joining. A further aspect is that the method may be performed with compact, lightweight and inexpensive equipment.

The method is suited for joining of all kinds of metals and alloys that are plastically formable or workable in solid or partially liquid state. The method is particularly suited for joining material components with good extrudablity, like light metal alloys in general and aluminium alloys in particular. In view of the method's excellence and characteristics, it is reason to assert that it represents a quantum leap in manufacturing technology with respect to joining of aluminium. Thus, the method is a realistic alternative both to conventional fusion welding methods and to friction welding (FSW included) within a number of market segments and product areas, hereunder transportation (cars, boats, aeroplanes, aeronautics), offshore, land based industry and for buildings where the requirements to the mechanical properties are particularly severe.

The invention claimed is:

1. Method for joining of light metal and light metal alloy components by means of a groove disposed between the components, comprising the steps of:

removing oxide is removed from groove surfaces immediately prior to joining;

extruding a pure solid metallic filler material under pressure through a die into the groove while simultaneously restricting oxygen flow into to the groove; and forcing the extruded metallic filler material against the surfaces of the groove sufficient to complete the joining by the extruded filler material.

2. Method according to claim 1, wherein the oxide is removed from the groove surfaces by means of mechanical scraping.

3. Method according to claim 1, wherein the extrusion comprises continuous extrusion of the filler material in powder or wire form.

4. Method according to claim 1, wherein the extrusion comprises batchwise extrusion.

5. Method according to claim 1, wherein the filler material is in a form of hermetically pre-packed elements.

6. Method according to claim 1, wherein the components are of homogenous chemical composition, and the filler material has a chemical composition corresponding to said components.

7. Method according to claim 1, wherein the components have different chemical compositions, and the filler material has a composition compatible with the chemical compositions of both components.

8. Method according to claim 1, wherein at least one of the groove surfaces and the filler material is preheated.

9. Method according to claim 8, wherein the preheating takes place by means of electrical resistance heating, induction heating, friction heating, laser beam heating or a combination thereof.

10. Method according to claim 1, wherein a portion of equipment used for conducting the method is preheated by Joule heating.

11. Method according to claim 10, wherein the heating takes place by means of electrical resistance heating or induction heating.

12. Method according to claim 1, additionally comprising controlling the method automatically by use of sensors for surveillance of temperature and optionally pressure during extrusion and joining, and use of controlling equipment connected to said sensors for controlling process parameters.

13. Method according to claim 12, wherein the process parameter controlled include at least one of speed of advancing the component, external heating and deposition rate of filler material into the groove.

14. Method according to claim 1, wherein oxygen flow into the groove is restricted by supplying inert or protective gas to the groove.

* * * * *